(12) United States Patent
Magnuson

(10) Patent No.: US 6,327,761 B1
(45) Date of Patent: Dec. 11, 2001

(54) APPARATUS FOR MACHINING A FLAT METALLIC WORKPIECE

(75) Inventor: James M. Magnuson, Bradley, IL (US)

(73) Assignee: Peddinghaus Corporation, Bradley, IL (US)

( * ) Notice: Subject to any disclaimer, the term of this patent is extended or adjusted under 35 U.S.C. 154(b) by 0 days.

(21) Appl. No.: 09/626,619

(22) Filed: Jul. 27, 2000

(51) Int. Cl.[7] ................................. B23Q 7/00; B23C 9/00
(52) U.S. Cl. ........................ 29/33 Q; 15/354; 29/26 A; 29/DIG. 94; 144/252.1; 408/67; 409/134; 409/137; 451/451
(58) Field of Search ...................... 29/33 Q, 26 A, 29/33 S, DIG. 94, DIG. 61, DIG. 56; 198/494, 495, 497; 405/134, 137; 15/354, 303; 408/67, 70; 144/252.1, 246.1; 451/451, 454, 453, 907

(56) References Cited

U.S. PATENT DOCUMENTS

| | | | |
|---|---|---|---|
| 3,581,888 | * 6/1971 | Kelly et al. | 198/494 X |
| 4,330,941 | * 5/1982 | Haley | 15/303 |
| 4,799,284 | * 1/1989 | Toriwaki et al. | 15/230.12 |
| 4,860,883 | * 8/1989 | Knaul | 198/495 |
| 5,787,566 | 8/1998 | Stursberg | 29/26 A X |
| 6,170,293 | * 1/2001 | Cody | 198/495 X |

FOREIGN PATENT DOCUMENTS

| | | | |
|---|---|---|---|
| 57-205040 | * 12/1982 | (JP) | 29/33 Q |
| 1251651 | * 10/1989 | (JP) | 409/137 |
| 403004977 | * 1/1991 | (JP) | 29/33 Q |

* cited by examiner

Primary Examiner—William Briggs
(74) Attorney, Agent, or Firm—Herbert Dubno; Andrew Wilford

(57) ABSTRACT

A machining apparatus has a frame, a conveyor on the frame extending in a workpiece travel direction and adapted to support a flat workpiece, a tool mount displaceable on the frame transversely of the direction, a material-removing tool on the mount for machining the workpiece with generation of particles, and a drive roller engageable with an upper surface of the workpiece upstream of the tool for advancing the workpiece in the direction past the tools. A shield is provided above the conveyor extending transverse to the direction upstream of the tools and downstream of the drive roller. At least one actuator serves for pressing the shield against the workpiece between the tools and the drive roller during machining of the workpiece. Nozzles immediately adjacent the shield are connected to a supply of compressed gas for directing a gas current at the workpiece and blowing particles thereon downstream in the direction.

7 Claims, 3 Drawing Sheets

APPARATUS FOR MACHINING A FLAT METALLIC WORKPIECE

FIELD OF THE INVENTION

The present invention relates to an apparatus for machining a workpiece. More particularly this invention concerns an automatic apparatus for material-removing machining, e.g. boring, planing, or milling, of a flat metallic workpiece.

BACKGROUND OF THE INVENTION

As described in U.S. Pat. No. 5,787,566 of Stursberg standard machining apparatus has a frame and a conveyor on the frame extending in a normally horizontal workpiece travel direction and adapted to support a flat workpiece. A tool mount displaceable on the frame transversely of the direction carries at least one a material-removing tool, e.g. a drill or a miller, for machining the workpiece with generation of particles. A drive roller engageable with an upper surface of the workpiece upstream of the tool advances the workpiece in the direction past the tools.

Such a machine can do programmed work. Typically the drive roller, which is in solid contact with the workpiece, is connected to a position detector that feeds to a central controller exact information about the exact position of the workpiece relative to the tools, which are then operated by the controller to do their various machining jobs at the appropriate locations.

Since such machining must often be carried out even very close to the downstream end of the workpiece it is necessary to position the drive unit including the drive roller very close to the machining station having the tools. This creates the problem of getting particles produced by the machining operation into the workpiece drive. Such particles are hard so that they can damage the drive roller and mar the workpiece finish. Furthermore they can allow the drive roller to slip on the workpiece which will cause the workpiece to be ruined.

OBJECTS OF THE INVENTION

It is therefore an object of the present invention to provide an improved machining apparatus.

Another object is the provision of such an improved machining apparatus which overcomes the above-given disadvantages, that is which prevents damage to the workpiece drive.

SUMMARY OF THE INVENTION

The instant invention is employed in a standard machining apparatus having a frame, a conveyor on the frame extending in a workpiece travel direction and adapted to support a flat workpiece, a tool mount displaceable on the frame transversely of the direction, a material-removing tool on the mount for machining the workpiece with generation of particles, and a drive roller engageable with an upper surface of the workpiece upstream of the tool for advancing the workpiece in the direction past the tools. According to the invention a shield is provided above the conveyor extending transverse to the direction upstream of the tools and downstream of the drive roller. At least one actuator serves for pressing the shield against the workpiece between the tools and the drive roller during machining of the workpiece. Nozzles immediately adjacent the shield are connected to a supply of compressed gas for directing a gas current at the workpiece and blowing particles thereon downstream in the direction.

Thus this system actively shields the drive rollers during the machining operation and, between operations when the shield is lifted, the nozzles are effective to prevent any particles from working their way back upstream. The shield is dropped into position before the machining operation starts and is not lifted until after it is completed. Anything that has worked its way upstream past the shield while it is raised between machining operations is blown back downstream by the nozzles before the shield is again lowered.

According to the invention the nozzles are provided immediately upstream of the shield and are formed as a transversely extending nozzle tube having a plurality of transversely spaced outlet openings. Further more a vertically displaceable housing carries the shield, the drive roller, and the actuator for engaging the nozzle against the workpiece. A separate actuator raises and lowers this housing. This housing makes servicing the apparatus fairly simple since the shield and nozzle along with the upper drive roller can all be taken off as a single unit.

The actuator that moves the shield is fluid powered actuator and braced between the shield and the housing. The housing is carried on a pair of arms that are pivoted to move it vertically.

Furthermore in accordance with the invention a controller connected to the drive roller and to the shield actuator includes a detector for sensing rotation of the drive roller.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
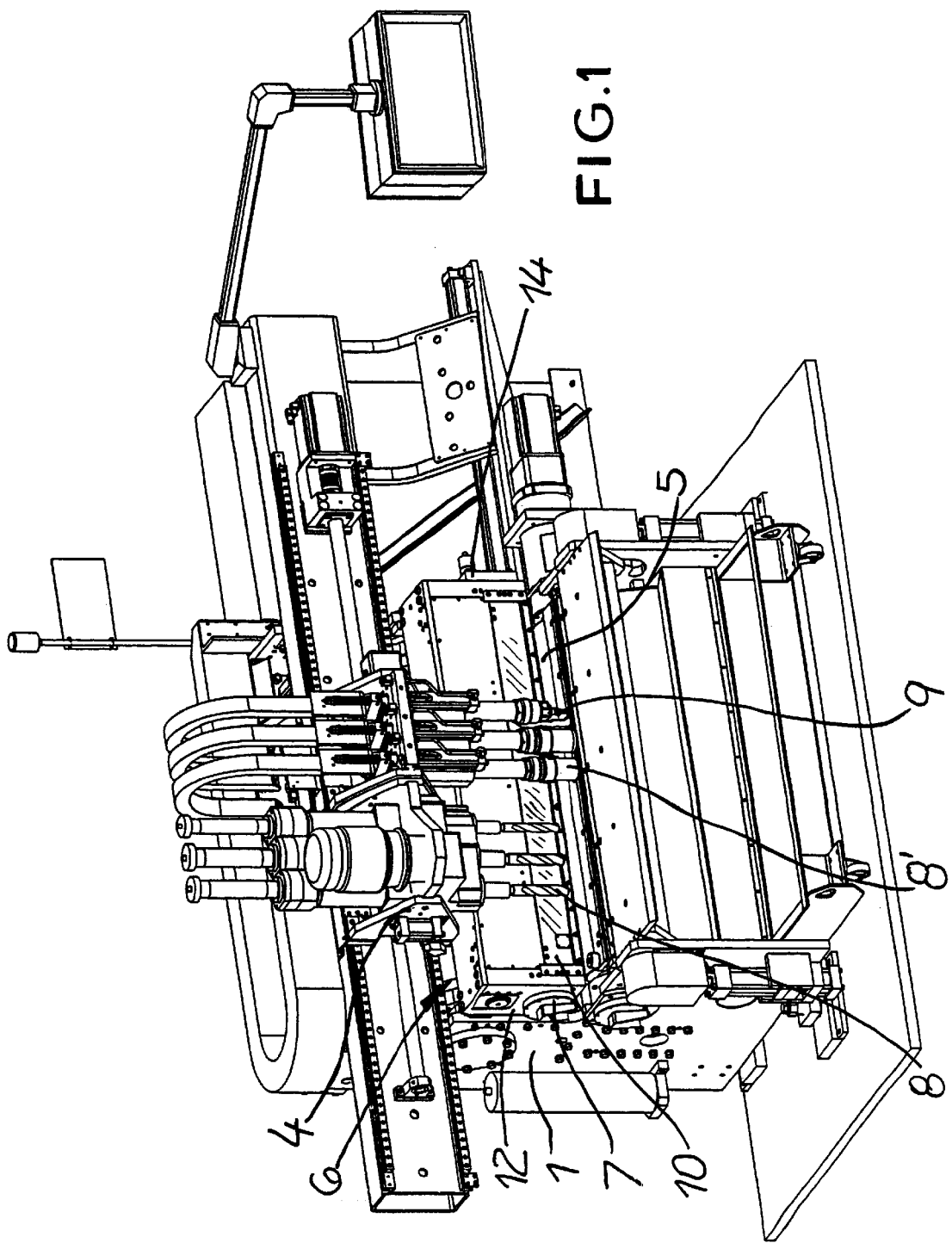
FIG. 1 is a small-scale perspective view of the apparatus according to the invention.
Figure 2:
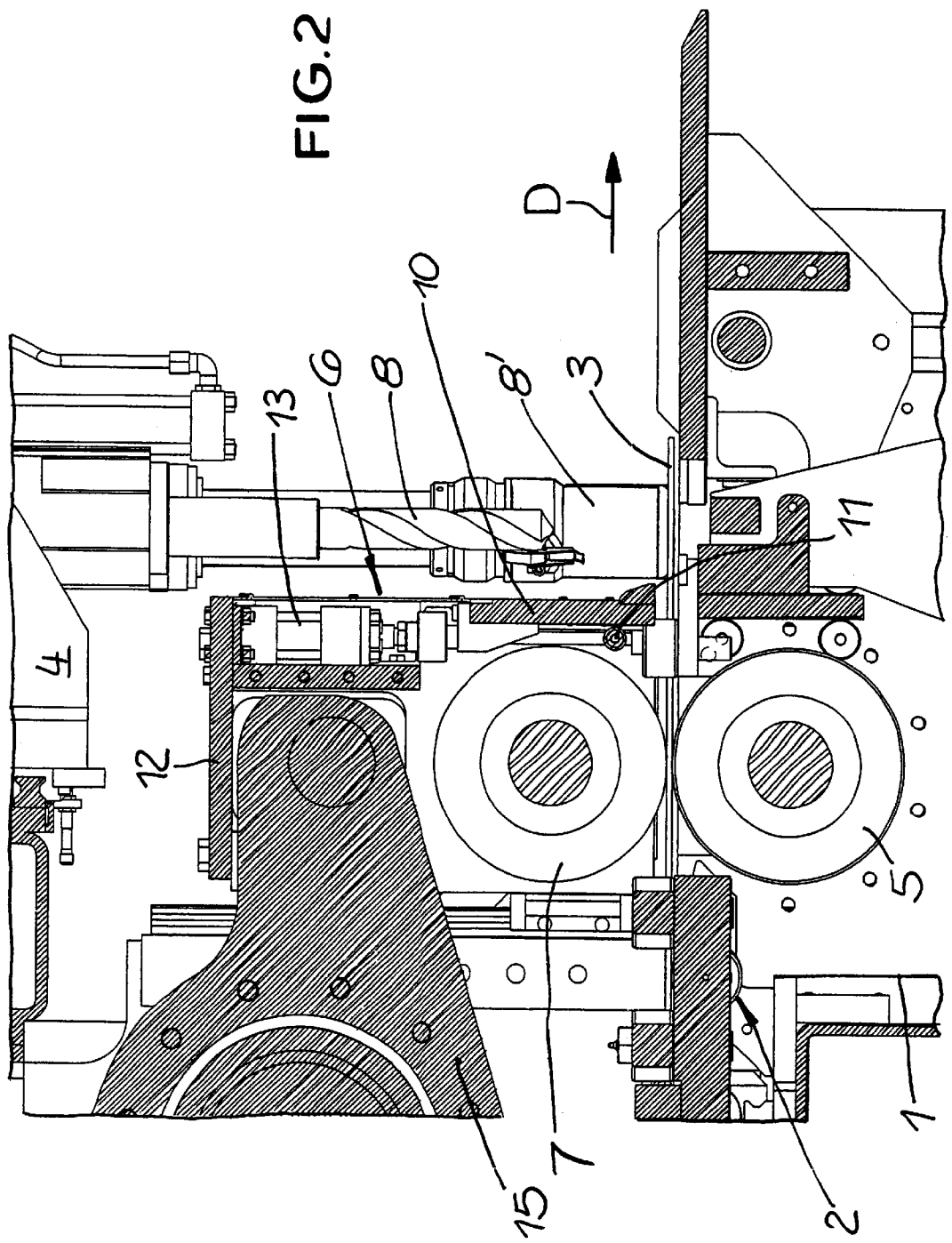
FIG. 2 is a vertical section through the apparatus.
Figure 3:
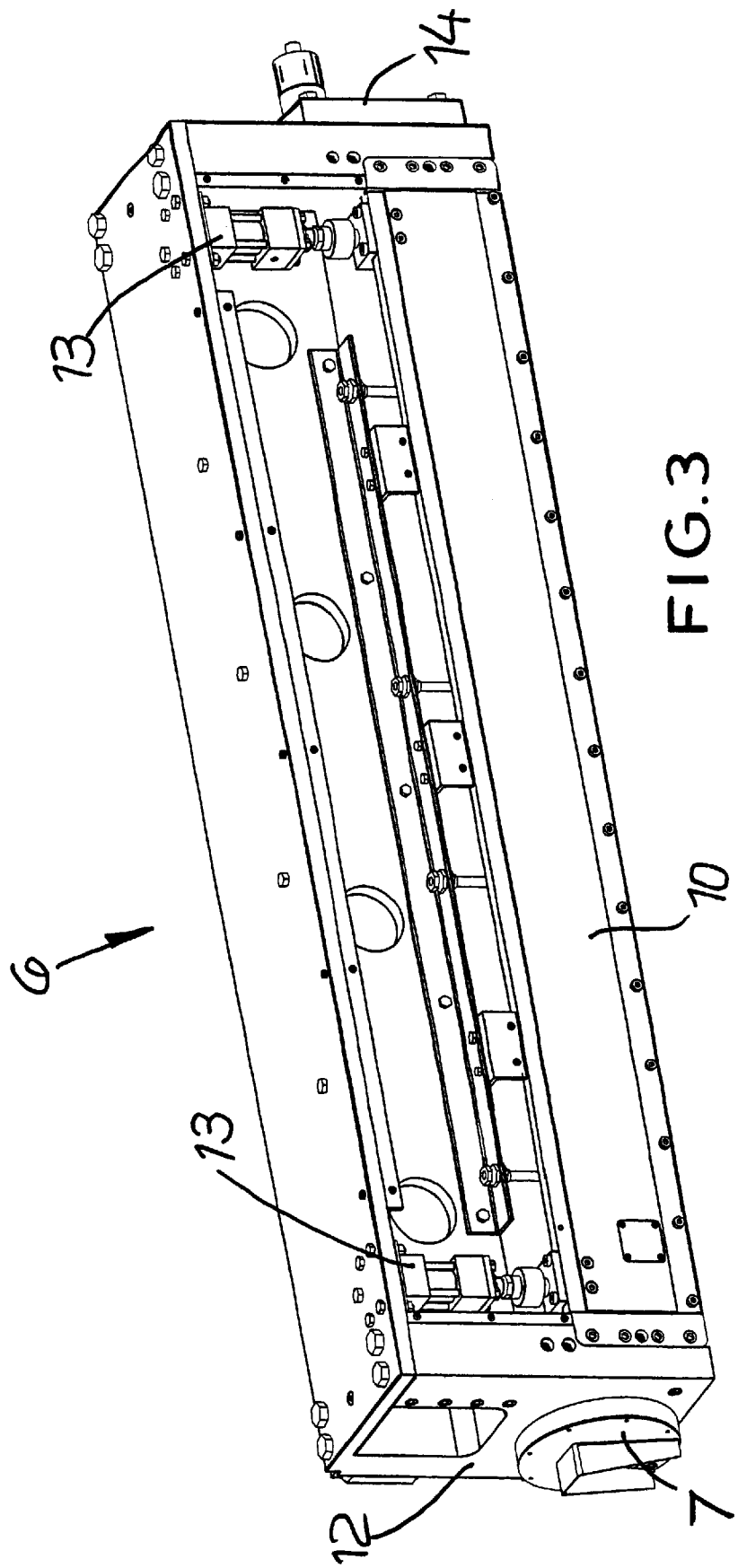
FIG. 3 is a small-scale perspective view of the feed subassembly of the apparatus.

As seen in FIGS. and 2 a machine frame 1 according to the invention supports a horizontal roller conveyor 2 defining a horizontal transport direction D for a workpiece 3, here a flat metal plate. A lower driven roller 5 engages a lower face of the workpiece 3 and a frame 6 presses an upper idler roller 7 down against an upper face of the workpiece 3 to press it against the driven roller 5. A short distance downstream in the direction D from the drive rollers 5 and 6 is a tool mount 4 carrying a drilling tool 8, a milling tool 8', and a cutting torch 9 that act on the workpiece 3, producing chips and particles that are projected outward from the machining location in all directions with some force when they are operating.

According to the invention a flat rigid shield plate 10 is provided extending and movable in a vertical plane between the drive rollers 5 and 6 and the machining tools 8, 8', and 9. In addition a nozzle tube 11 is provided immediately upstream of the shield plate 10 with its nozzles directed at the workpiece 3 and in the travel direction D. Thus no particles will be able to work their way back upstream into the drive rollers 5 and 6.

The shield 10 and nozzle tube 11 are carried on a box-like housing 12, and the shield 10 itself is displaceable on this housing 12 by its own fluid-powered actuators 13 braced against a top wall of the housing 12. The idler drive roller 6 is also carried on this housing 12 which is vertically displaceable by arms 15 pivoted on the machine frame 1. In addition a position detector 14 is provided for detecting rotation of the rollers 5 and 7.

With this system the nozzle tube 11 projects a curtain of air out and across the workpiece 3 in the travel direction so that as it is advanced no particles can get caught between the rollers 5 and 7 and the workpiece 3. Once the workpiece 3 is in position and ready to be machined, the actuators 13 drop the shield 10 down on it to prevent the particles and chips that are generated by the machining operations from getting back into the upstream drive rollers 5 and 7.

I claim:

1. In a machining apparatus having
    a frame;
    a conveyor on the frame extending in a workpiece travel direction and adapted to support a flat workpiece;
    a tool mount displaceable on the frame transversely of the direction;
    a material-removing tool on the mount for machining the workpiece with generation of particles; and
    a drive roller engageable with an upper surface of the workpiece upstream of the tool for advancing the workpiece in the direction past the tool,
the improvement comprising:
    a shield above the conveyor and extending transverse to the direction upstream of the tool and downstream of the drive roller;
    means for engaging the shield against the workpiece between the tool and the drive roller during machining of the workpiece; and
    means including nozzles immediately adjacent the shield for directing a gas current at the workpiece and blowing particles thereon downstream in the direction.

2. The machining apparatus defined in claim 1 wherein the nozzles are provided immediately upstream of the shield.

3. The machining apparatus defined in claim 1 wherein the means for engaging includes
    a housing carrying the shield, the drive roller, and the means for engaging the nozzle against the workpiece; and
    means for vertically displacing the housing.

4. The machining apparatus defined in claim 3 wherein the means for engaging include at least one fluid-powered actuator braced between the shield and the housing.

5. The machining apparatus defined in claim 3 wherein the means for vertically displacing the housing includes at least one arm pivoted on the frame and carrying the housing.

6. The machining apparatus defined in claim 1, further comprising
    control means connected to the drive roller and to the means for engaging and including a detector for sensing rotation of the drive roller.

7. The machining apparatus defined in claim 1 wherein the nozzle is formed as a transversely extending nozzle tube having a plurality of transversely spaced outlet openings.

* * * * *